United States Patent
Yaguchi (10) Patent No.: US 11,349,394 B2
(45) Date of Patent: May 31, 2022

(54) POWER SUPPLY CONTROL DEVICE AND POWER SUPPLY CONTROL METHOD FOR CONTROLLING SWITCHING DEVICE OF BOOST CHOPPER

(71) Applicant: FUJI ELECTRIC CO., LTD., Kanagawa (JP)

(72) Inventor: Yukihiro Yaguchi, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 17/033,918

(22) Filed: Sep. 27, 2020

(65) Prior Publication Data
US 2021/0013806 A1    Jan. 14, 2021

Related U.S. Application Data

(63) Continuation of application No. PCT/JP2019/033426, filed on Aug. 27, 2019.

(30) Foreign Application Priority Data

Oct. 4, 2018  (JP) .............................. JP2018-189008

(51) Int. Cl.
*H02M 3/158*   (2006.01)
*H02M 1/08*   (2006.01)
*H02M 1/00*   (2006.01)

(52) U.S. Cl.
CPC .............. *H02M 3/158* (2013.01); *H02M 1/08* (2013.01); *H02M 1/0009* (2021.05)

(58) Field of Classification Search
CPC ........ H02M 3/158; H02M 3/156; H02M 1/08; H02M 1/0009; H02M 1/0064; H02M 1/15; H02M 1/4225; H02M 1/32; Y02B 70/10

See application file for complete search history.

(56) References Cited

U.S. PATENT DOCUMENTS

2004/0085052 A1   5/2004  Itabashi
2012/0075889 A1   3/2012  Sasaki
(Continued)

FOREIGN PATENT DOCUMENTS

JP    H05199757 A    8/1993
JP    2002051563 A   2/2002
(Continued)

OTHER PUBLICATIONS

(ISA/237) Written Opinion of the International Search Authority for International Patent Application No. PCT/JP2019/033426, issued/mailed by the Japan Patent Office dated Nov. 19, 2019.

*Primary Examiner* — Matthew V Nguyen
*Assistant Examiner* — Jye-June Lee (57) ABSTRACT

A power supply control device includes a switch control unit configured to control ON/OFF of a switching device of a boost chopper by using an oscillation wave, a comparison voltage generating unit configured to charge or discharge comparison capacitor that generates a comparison voltage for comparison with the oscillation wave in correspondence with a DC output voltage outputted from the boost chopper, an input increase detecting unit configured to detect whether a detection value corresponding to current flowing through the boost chopper has increased to or above a detection criterion, an output voltage detecting unit configured to detect whether the DC output voltage is at or above the lower limit voltage, a discharging unit configured to discharge the comparison capacitor when the detection value has increased to or above the detection criterion and the DC output voltage is at or above the lower limit voltage.

7 Claims, 3 Drawing Sheets

(56) References Cited

U.S. PATENT DOCUMENTS

| | | | |
|---|---|---|---|
| 2013/0308360 A1 | 11/2013 | Koiwai | |
| 2017/0019030 A1 | 1/2017 | Sugawara | |
| 2018/0226877 A1 | 8/2018 | Fukumoto | |
| 2020/0161973 A1* | 5/2020 | Fukushima | H02M 3/158 |
| 2020/0389087 A1* | 12/2020 | Hiasa | H02M 3/156 |
| 2021/0013797 A1* | 1/2021 | Endo | H02M 1/4225 |

FOREIGN PATENT DOCUMENTS

| | | |
|---|---|---|
| JP | 2004173481 A | 6/2004 |
| JP | 2012070571 A | 4/2012 |
| JP | 2017028778 A | 2/2017 |
| JP | 2018130011 A | 8/2018 |
| WO | 2012105200 A1 | 8/2012 |

\* cited by examiner

POWER SUPPLY CONTROL DEVICE AND POWER SUPPLY CONTROL METHOD FOR CONTROLLING SWITCHING DEVICE OF BOOST CHOPPER

The contents of the following Japanese patent application are incorporated herein by reference:
2018-189008 filed in JP on Oct. 4, 2018 and;
PCT/JP2019/033426 filed on Aug. 27, 2019.

BACKGROUND

1. Technical Field

The present invention relates to a power supply control device and power supply control method.

2. Related Art

Conventionally, a power supply control device including a boost chopper uses an error amplifier (transconductance amplifier) to perform feedback control in order to maintain an output voltage (for example, see Patent document 1 to 3). For example, the error amplifier outputs current corresponding to a voltage difference between a divided voltage of a DC output voltage inputted to an inverting input terminal and a reference voltage connected to a non-inverting input terminal. An output terminal of the error amplifier is connected to a capacitor charged by the output current from the error amplifier and a pulse width modulation comparator that controls an ON-width of a switching device. Thus, the ON-width of the switching device is controlled in correspondence with the voltage difference between the DC output voltage and the reference voltage to maintain the output voltage.

[Patent document 1] Japanese Unexamined Patent Application, Publication No. 2002-51563
[Patent document 2] Japanese Unexamined Patent Application, Publication No. Hei 5-199757
[Patent document 3] WO2012/105200

In a conventional power supply control device, when an input is suddenly increased, switching control will be performed without reduction of the charge amount of a capacitor. As a result, the ON-width may be widened to cause overvoltage of an output voltage, which may destruct components of the power supply control device.

SUMMARY

In order to solve the above-mentioned problem, a first aspect of the present invention provides a power supply control device. The power supply control device may include a switch control unit configured to control ON/OFF of a switching device of a boost chopper by using an oscillation wave. The power supply control device may include a comparison voltage generating unit configured to charge or discharge a comparison capacitor that generates a comparison voltage for comparison with the oscillation wave in correspondence with a DC output voltage outputted from the boost chopper. The power supply control device may include an input increase detecting unit configured to detect whether a detection value corresponding to current flowing through the boost chopper has increased to or above a detection criterion. The power supply control device may include an output voltage detecting unit configured to detect whether the DC output voltage is at or above the lower limit voltage. The power supply control device may include a discharging unit configured to discharge the comparison capacitor when the detection value has increased to or above the detection criterion and the DC output voltage is at or above the lower limit voltage.

The input increase detecting unit may include a sampling circuit configured to sample a detection value corresponding to the current flowing through the boost chopper depending on the timing of switching the switching device from ON to OFF. The input increase detecting unit may include an increase detecting circuit configured to detect whether the detection value corresponding to the current flowing through the boost chopper has increased to or above the detection criterion relative to the detection value sampled by the sampling circuit.

The input increase detecting unit may input, as the detection value, a voltage generated at a current detecting resistor connected in series to an inductor and the switching device of the boost chopper.

The power supply control device may further include a switching stop unit configured to control the switching device to be OFF for a predetermined period when the detection value corresponding to the current flowing through the boost chopper has increased to or above the detection criterion and the DC output voltage is at or above the lower limit voltage.

The input increase detecting unit may detect that the detection value corresponding to the current flowing through the boost chopper has increased to or above the detection criterion when a rated value of an input AC voltage is raised due to switching of a power source that supplies electrical power to the boost chopper.

The comparison voltage generating unit may charge or discharge the comparison capacitor by charging or discharging current corresponding to the difference between the DC output voltage and the reference voltage.

A second aspect of the present invention provides a power supply control method. The power supply control method may include controlling ON/OFF of a switching device of a boost chopper by using an oscillation wave. The power supply control method may include charging or discharging a comparison capacitor that generates a comparison voltage for comparison with the oscillation wave in correspondence with a DC output voltage outputted from the boost chopper. The power supply control method may include detecting whether a detection value corresponding to current flowing through the boost chopper has increased to or above a detection criterion. The power supply control method may include detecting whether the DC output voltage is at or above the lower limit voltage. The power supply control method may include discharging the comparison capacitor when the detection value has increased to or above the detection criterion and the DC output voltage is at or above the lower limit voltage.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through the embodiments of the invention, but the following embodiments do not limit the invention according to the claims. In addition, not all of the combinations of features described in the embodiments are essential to the solving means of the invention.

[1. Configuration of a Power Supply Device]

Figure 1:
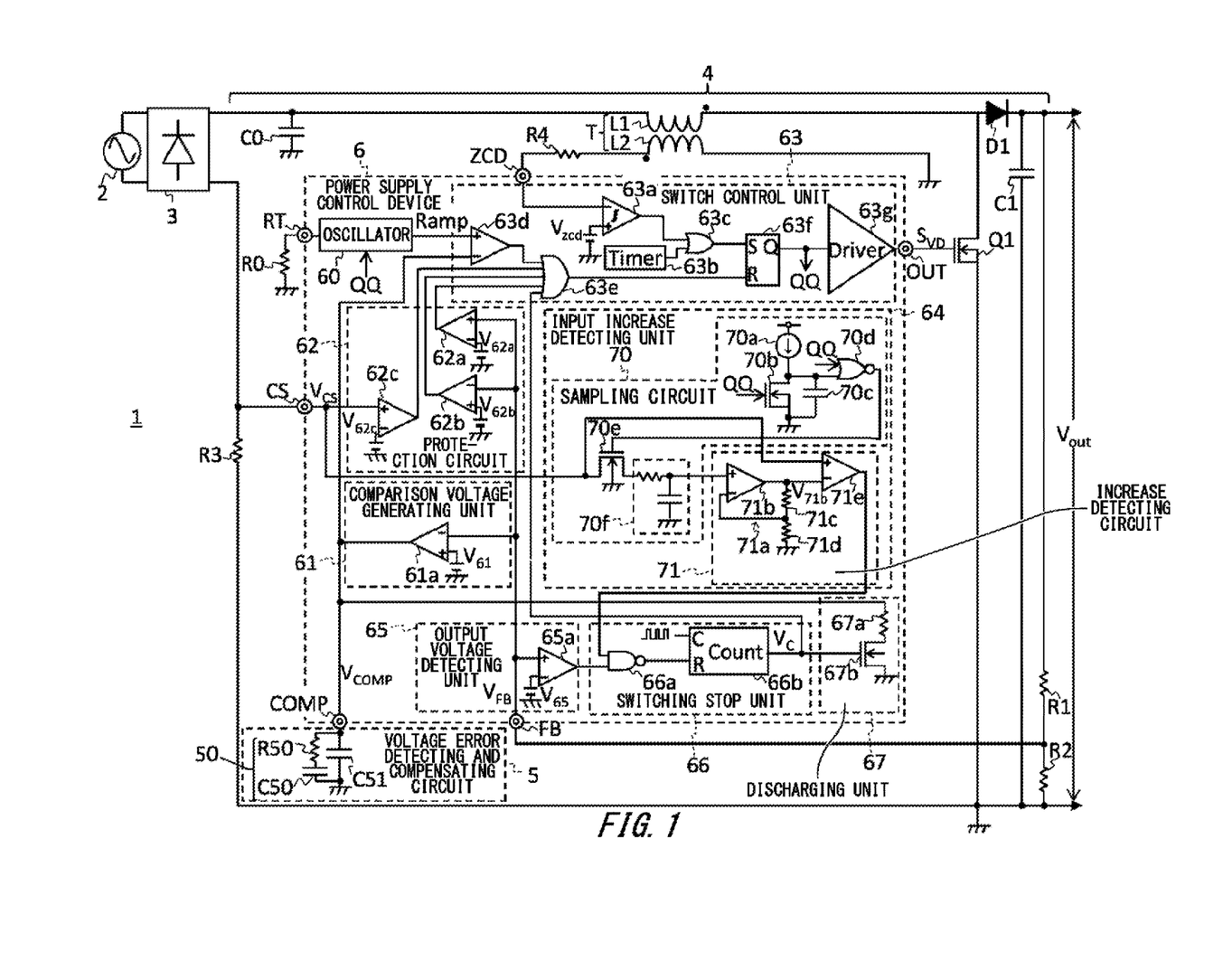
FIG. 1 shows a power supply device 1 according to the present embodiment.

FIG. 1 shows a power supply device 1 according to the present embodiment. The power supply device 1 is configured to output a DC output voltage $V_{out}$ (as an example, 400 V) and is connected to a load, for example, of about 250 W. The power supply device 1 includes an AC power supply 2, a full-wave rectifying circuit 3 for full-wave rectifying an AC input voltage of the AC power supply 2, and a boost chopper 4 for boosting a DC output voltage of the full-wave rectifying circuit 3.

[1-1. Boost Chopper 4]

A boost chopper 4 is connected between a positive-terminal output side and a negative-terminal output side of the full-wave rectifying circuit 3, and, in the present embodiment, as an example, serves as a power-factor correction circuit such as a critical control mode). The boost chopper 4 includes a smoothing capacitor C0, a transformer T, and a diode D1 that are connected in series to a positive-terminal output side of the full-wave rectifying circuit 3, a boost switching device Q1, an output capacitor C1 connected between the cathode side of the diode D1 and the negative-terminal output side of the full-wave rectifying circuit 3, voltage dividing resistors R1, R2 connected in parallel to the output capacitor C in order to detect a output voltage $V_{out}$, a timing resistor R0, a current detecting resistor R3, a zero cross detecting resistor R4, a voltage error detecting and compensating circuit 5, and a power supply control device 6.

The smoothing capacitor C0 smoothes current flowing through the positive-terminal output side of the full-wave rectifying circuit 3. The transformer T includes a primary inductor L1 that is provided on the positive-terminal output side of the full-wave rectifying circuit 3 and a secondary inductor L2 that is grounded at one end. The inductor L1 rectifies current flowing through the positive-terminal output side of the full-wave rectifying circuit 3, and boosts the DC output voltage of the full-wave rectifying circuit 3 by using an inductive voltage, in association with operations inside the boost chopper 4. Inductor current IL1 flowing through the primary inductor L1 may be, as an example, harmonic pulsating current of 10 kHz to 1000 kHz. The diode D1 serves as a backflow prevention diode. The switching device Q1 is, for example, an N-channel MOS transistor. Instead, the switching device Q1 may be another type of a MOS transistor or an IGBT, etc. The drain and the source of the switching device Q1 is electrically connected to a connecting point of the inductor L1 and the anode side of the diode D1, and the negative-terminal output side of the full-wave rectifying circuit 3, respectively. The gate of the switching device Q1 is driven by a drive signal from the power supply control device 6. As an example, the switching device Q1 is driven by PWM. The output capacitor C1 removes high-frequency components caused by switching operation from the voltage outputted from the power supply device 1. The voltage dividing resistors R1, R2 are connected in series to each other. The timing resistor R0 is configured to determine a gradient of an oscillation wave of an oscillator 60 described below, and is grounded at one end. The current detecting resistor R3 is configured to detect a voltage corresponding to the inductor current ILL, and is connected in series to the inductor L1 and the switching device Q1. For example, the current detecting resistor R3 may be connected between the negative-terminal output side of the full-wave rectifying circuit 3 and the ground. The zero cross detecting resistor R4 is configured to detect a voltage corresponding to the inductor current IL1 (that is, in the present embodiment, as an example, a voltage corresponding to the inductor current IL2 flowing through the secondary inductor L2), and is connected to the secondary inductor L2 of the transformer T at one end.

[1-1-1. Voltage Error Detecting and Compensating Circuit 5]

The voltage error detecting and compensating circuit 5 is configured to remove ripple components of an error signal $V_{COMP}$ that will be described below, and is connected between the power supply control device 6 and the ground. The voltage error detecting and compensating circuit 5 includes a capacitor C51 and a RC phase compensation circuit 50 that are connected in parallel. The RC phase compensation circuit 50 includes a resistor R50 and a capacitor C50 that are connected in series. The capacitor C51 and/or capacitor C50, which is an example of a comparison capacitor, generate an error signal $V_{COMP}$ as a comparison voltage for comparison with the oscillation wave in correspondence with the charge amount.

[1-1-2. Power Supply Control Device 6]

The power supply control device 6, which may be an IC for example, includes a feedback terminal FB as an output voltage detecting terminal, an output terminal OUT, a voltage error detecting and compensating terminal COMP, a resistor connecting terminal RT, a current detecting terminal CS configured to detect the inductor current IL1 (in the present embodiment, as an example, the inductor current IL2), and a zero cross detecting terminal ZCD. Note that the power supply control device 6 may further include a power source terminal and a ground terminal. The feedback terminal FB is connected to a connecting point between the voltage dividing resistors R1, R2, and receives a feedback voltage $V_{FB}$ obtained by dividing the output voltage $V_{out}$ of the power supply device 1. The output terminal OUT is connected to the gate of the boost switching device Q1, and outputs a drive signal $S_{VD}$ that is pulse-width modulated in order to drive the switching device Q1. The voltage error detecting and compensating terminal COMP is connected to the voltage error detecting and compensating circuit 5. The resistor connecting terminal RT is connected to the other end (the ungrounded end) of the timing resistor R0. The current detecting terminal CS is connected to a connecting point between the full-wave rectifying circuit 3 and the current detecting resistor R3, and receives a detection voltage $V_{CS}$ corresponding to the inductor current IL1 flowing through the current detecting resistor R3. The zero cross detecting terminal ZCD is connected to the other end (the end opposite to the secondary inductor L2) of the zero cross detecting resistor R4, and receives a detection voltage $V_{ZCD}$ corresponding to the inductor current IL2 flowing through the zero cross detecting resistor R4.

The power supply control device 6 includes an oscillator 60, a comparison voltage generating unit 61, a protection circuit 62, a switch control unit 63, an input increase detecting unit 64, an output voltage detecting unit 65, a switching stop unit 66, and a discharging unit 67.

[1-1-2(1). Oscillator 60]

The oscillator 60 generates an oscillation wave. In the present embodiment, as an example, the oscillator 60 generates a ramp wave Ramp as the oscillation wave. The ramp wave Ramp may be triangular-wave shaped (as an example, sawtooth shaped). For example, the oscillator 60 is connected to the timing resistor R0 via the resistor connecting terminal RT of the power supply control device 6, and generates a sawtooth shaped ramp wave Ramp with a gradient corresponding to the resistance value of the timing resistor R0. The oscillator 60 provides the ramp wave Ramp to the switch control unit 63. The oscillator 60 may start generating a ramp wave Ramp when a trigger signal is inputted (in the present embodiment, as an example, when a high-level positive output signal QQ is inputted from an RS flip-flop 63f described below), and stop generating the ramp wave Ramp to be reset when the trigger signal is not inputted (in the present embodiment, as an example, when a low-level positive output signal QQ is inputted).

[1-1-2(2). Comparison Voltage Generating Unit 61]

The comparison voltage generating unit 61 charges or discharges the comparison capacitors C50, C51 in correspondence with the DC output voltage $V_{out}$ outputted from the boost chopper 4. In the present embodiment, as an example, the comparison voltage generating unit 61 charges or discharges the comparison capacitors C50, C51 in correspondence with the feedback voltage VF. The comparison voltage generating unit 61 includes an error amplifier 61a. The error amplifier 61a amplifies the voltage difference between the feedback voltage VF and the reference voltage $V_{61}$. An inverting input side of the error amplifier 61a receives the feedback voltage $V_{FB}$, and a non-inverting input side of the error amplifier 61a receives the reference voltage $V_{61}$ corresponding to a target output voltage. The error amplifier 61a may be a transconductance amplifier. The error amplifier 61a may generate current corresponding to the voltage difference between the feedback voltage VF and the reference voltage $V_{61}$ (also called "charging or discharging current"), and generate an error signal $V_{COMP}$ by charging or discharging the capacitors C50, C51 of the voltage error detecting and compensating circuit 5 connected to the voltage error detecting and compensating terminal COMP with charging or discharging current. Generating an error signal $V_{COMP}$ by using the voltage error detecting and compensating circuit 5 smoothes ripple components included in the output current of the error amplifier 61a and causes the error signal $V_{COMP}$ to be a substantially DC voltage in a steady state. The error signal $V_{COMP}$ will be provided to the switch control unit 63, etc. Note that the reference voltage $V_{61}$ may be the maximum feedback voltage $V_{fb}$.

[1-1-2(3). Protection Circuit 62]

The protection circuit 62 protects components of the power supply control device 6 in the event of overvoltage or short circuit. The protection circuit 62 includes an overvoltage detecting comparator 62a, a short circuit detecting comparator 62b, and an overcurrent detecting comparator 62c.

The overvoltage detecting comparator 62a is configured to detect overvoltage of the DC output voltage $V_{out}$. A non-inverting output terminal of the overvoltage detecting comparator 62a is connected to the feedback terminal FB to receive a feedback voltage $V_{FB}$, and an inverting input terminal of the overvoltage detecting comparator 62a receives a reference voltage $V62_a$ as a threshold for detecting overvoltage. Thus, when the feedback voltage $V_{FB}$ is higher than the reference voltage $V62_a$, an output signal of the overvoltage detecting comparator 62a becomes high-level to indicate overvoltage. The overvoltage detecting comparator 62a provides the output signal to the switch control unit 63. As detailed below, when the high-level output signal is provided from the overvoltage detecting comparator 62a to the switch control unit 63, the switch control unit 63 turns OFF the switching device Q1 to eliminate the overvoltage state.

The short circuit detecting comparator 62b is configured to detect short circuit. A non-inverting output terminal of the short circuit detecting comparator 62b receives a reference voltage $V62_b$ as a threshold for detecting short circuit, and an inverting output terminal of the short circuit detecting comparator 62b is connected to the feedback terminal FB to receive a feedback voltage $V_{FB}$. Thus, when the feedback voltage $V_{FB}$ is lower than the reference voltage $V62_b$, an output signal of the short circuit detecting comparator 62b becomes high-level to indicate short circuit. The short circuit detecting comparator 62b provides the output signal to the switch control unit 63. As detailed below, when the high-level output signal is provided from the short circuit detecting comparator 62b to the switch control unit 63, the switch control unit 63 turns OFF the switching device Q1 to eliminate the short circuit state.

The overcurrent detecting comparator 62c is configured to detect overcurrent of the current flowing through the boost chopper 4. A non-inverting output terminal of the overcurrent detecting comparator 62c is connected to the current detecting terminal CS to receive a detection voltage $V_{CS}$, and an inverting input terminal of the overcurrent detecting comparator 62c receives a reference voltage $V62_c$ as a threshold for detecting overcurrent. Thus, when the detection voltage $V_{CS}$ is higher than the reference voltage $V62_c$, an output signal of the overcurrent detecting comparator 62c becomes high-level to indicate overcurrent. The overcurrent detecting comparator 62c provides the output signal to the switch control unit 63. As detailed below, when the high-level output signal is provided from the overcurrent detecting comparator 62c to the switch control unit 63, the switch control unit 63 turns OFF the switching device Q1 to eliminate the overcurrent state.

[1-1-2(4). Switch Control Unit 63]

The switch control unit 63 controls ON/OFF of the switching device Q1 by using an oscillation wave (in the present embodiment, as an example, a ramp wave Ramp). The switch control unit 63 includes a zero cross detecting comparator 63a, a restart timer 63b, an OR gate 63c, a pulse width modulation comparator 63d, an OR gate 63e, an RS flip-flop 63f, and a driver 63g.

The zero cross detecting comparator 63a detects that current flowing through the boost chopper 4 (in the present embodiment, as an example, the inductor current IL2) is zero. A non-inverting input terminal of the zero cross detecting comparator 63a receives a reference voltage $V_{zcd}$, and an inverting input terminal of the zero cross detecting comparator 63a is connected to the zero cross detecting terminal ZCD to receive a detection voltage $V_{ZCD}$ corresponding to the inductor current IL2. The reference voltage $V_{zcd}$ may be a voltage when the inductor current IL2 is zero (or substantially zero). Thus, an output signal of the zero cross detecting comparator 63a (also called "zero cross detecting signal") becomes high-level when the inductor current IL2 is zero, and becomes low-level when the inductor current IL2 is not zero. The zero cross detecting comparator 63a provides the output signal to a set terminal of the RS flip-flop 63f via the OR gate 63c. Thus, the RS flip-flop 63f will be set when the current flowing through the boost chopper 4 becomes zero current. The zero cross detecting comparator 63a may have hysteresis characteristics. When no zero current is detected during a preset period, the restart timer 63b provides an output signal to the set terminal of the RS flip-flop 63f via the OR gate 63c.

The pulse width modulation comparator 63d outputs a pulse width modulation signal to modulate the pulse width of a drive signal for the switching device Q1. A non-inverting input terminal of the pulse width modulation comparator 63d receives an oscillation wave (in the present embodiment, as an example, a ramp wave Ramp) from the oscillator 60, and an inverting input terminal of the pulse width modulation comparator 63d receives an error signal $V_{COMP}$ generated by the error amplifier 61a and the voltage error detecting and compensating circuit 5. Thus, the output signal of the pulse width modulation comparator 63d becomes low-level when an instantaneous value of the oscillation wave is below the error signal $V_{COMP}$, and becomes high-level when the instantaneous value of the oscillation wave is equal to or above the error signal $V_{COMP}$. The pulse width modulation comparator 63d outputs the output signal to the OR gate 63e. Note that the error signal $V_{COMP}$ is constant when the magnitude of a load connected to the power supply device 1 is constant, so that the time period during which the output signal of the pulse width modulation comparator 63d is high-level or low-level may be constant.

The OR gate 63e provides a signal of the logical sum of a pulse width modulation signal from the pulse width modulation comparator 63d and each output signal from the protection circuit 62, to the RS flip-flop 63f. A reset terminal R of the RS flip-flop 63f receives an output signal of the OR gate 63e, and the set terminal S of the RS flip-flop 63f receives an output signal of the OR gate 63c. The RS flip-flop 63f outputs a high-level positive output signal QQ in a set state, and outputs a low-level positive output signal QQ in a reset state. The RS flip-flop 63f provides the positive output signal QQ from a positive output terminal Q to the oscillator 60, the driver 63g, and a sampling circuit 70. The driver 63g outputs a drive signal $S_{VD}$ to the gate of the switching device Q1 via the output terminal OUT. For example, when a high-level positive output signal QQ is inputted to the driver 63g, the driver 63g may turn ON the switching device Q1 by outputting a high-level drive signal $S_{VD}$. Note that, as described above, in the present embodiment, the positive output signal QQ from the RS flip-flop 63f is also provided to the oscillator 60 as a trigger signal. Therefore, the oscillator 60 starts generating an oscillation wave at the same timing as the switching device Q1 being turned ON.

[1-1-2(5). Input Increase Detecting Unit 64]

The input increase detecting unit 64 detects whether a detection value corresponding to the inductor current IL1 (in the present embodiment, as an example, a detection voltage $V_{CS}$ detected by the current detecting resistor R3) has increased to or above the detection criterion. The input increase detecting unit 64 includes a sampling circuit 70 and an increase detecting circuit 71.

The sampling circuit 70 samples a detection voltage $V_{CS}$ at the timing of switching the switching device Q1 from ON to OFF. The sampling circuit 70 includes a current source 70a, an N-channel MOSFET 70b, a capacitor 70c, an NOR gate 70d, and an N-channel MOSFET 70e. The current source 70a provides constant current to a parallel circuit that consists of the N-channel MOSFET 70b and the capacitor 70c. The N-channel MOSFET 70b is connected between the current source 70a and the ground, and is driven by a positive output signal QQ from the RS flip-flop 63f of the switch control unit 63. The capacitor 70c is connected in parallel to the N-channel MOSFET 70b. The capacitor 70c is charged by current from the current source 70a when the N-channel MOSFET 70b is OFF, and is discharged when the N-channel MOSFET 70b is ON. The NOR gate 70d provides an inverted signal of the logical sum of the positive output signal QQ from the RS flip-flop 63f and the charge voltage of the capacitor 70c, to the gate of the N-channel MOSFET 70e. The charge voltage inputted to the NOR gate 70d may be considered low-level when the charge voltage is below a logical threshold, and may be considered high-level when the charge voltage is at or above the logical threshold. The N-channel MOSFET 70e is connected between the current detecting terminal CS and the increase detecting circuit 71. When the output signal from the NOR gate 70d is high-level, the N-channel MOSFET 70e turns ON to sample a detection voltage Vs, and provides the sampled detection voltage to the increase detecting circuit 71. An integrating circuit 70f may be provided between the N-channel MOSFET 70e and the increase detecting circuit 71. The integrating circuit integrates a detection voltage $V_{CS}$ provided from the N-channel MOSFET 70e, and provides the integrated value to the increase detecting circuit 71.

In the sampling circuit 70 as described above, when the positive output signal QQ from the RS flip-flop 63f is high-level (that is, when the switching device Q1 is ON), the N-channel MOSFET 70b being in the ON state, so that the capacitor 70c will be discharged to maintain the charge voltage to the low-level. In addition, when the positive output signal QQ is high-level, which means that the output signal of the NOR gate 70d is low-level, the N-channel MOSFET 70e is in the OFF state, so that no detection voltage $V_{CS}$ will be sampled. Subsequently, when the positive output signal QQ falls to low-level in order to turn OFF the switching device Q1, the N-channel MOSFET 70b turns OFF to raise the charge voltage of the capacitor 70c. At this point, when the charge voltage is below the logical threshold of the NOR gate 70d, the output signal of the NOR gate 70d becomes high-level. Thus, the N-channel MOSFET 70e is turned ON to start sampling a detection voltage $V_{CS}$. When the charge voltage reaches the logical threshold of the NOR gate 70d, the output signal of the NOR gate 70d falls to low-level. Thus, the N-channel MOSFET 70e is turned OFF to finish sampling the detection voltage $V_{CS}$. Thus, the detection voltage $V_{CS}$ is sampled during a certain time period at the timing of turning OFF the switching device Q1.

The increase detecting circuit 71 detects whether the detection voltage $V_{CS}$ from the current detecting terminal CS has increased to or above the detection criterion relative to the detection voltage $V_{CS}$ sampled by the sampling circuit 70. The increase detecting circuit 71 includes a differential amplifier 71a and a comparator 71e. The differential amplifier 71a includes an amplifier 71b and voltage dividing resistors 71c, 71d. A non-inverting input terminal of the amplifier 71b receives a detection voltage $V_{CS}$ sampled by the sampling circuit 70, and an inverting input terminal of the amplifier 71b receives a voltage obtained by dividing the output voltage of the amplifier 71b with the voltage dividing resistors 71c, 71d. In this context, the gain of the differential amplifier 71a is an example of the detection criterion. In the present embodiment, as an example, the gain of the differential amplifier 71a is expressed as $(R_{71c}+R_{71d})/R_{71d}$, where $R_{71c}$, $R_{71d}$ are the resistance values of the voltage dividing resistors 71c, 71d respectively. Thus, the output signal $V_{71b}$ of the amplifier 71b is a voltage obtained by multiplying the sampled detection voltage $V_{CS}$ by the gain $(R_{71c}+R_{71d})/R_{71d}$ as a detection criterion. A non-inverting input terminal of the comparator 71e receives a present detection voltage $V_{CS}$, and an inverting input terminal of the comparator 71e receives an output signal $V_{71b}$ of the differential amplifier 71a (that is, a detection voltage $V_{CS}$ which is sampled by the sampling circuit 70 and multiplied by the gain of the differential amplifier 71a). Thus, an output signal of the comparator 71e becomes high-level to indicate sudden increase of the input when the detection voltage $V_{CS}$ has increased to or above the detection criterion relative to the detection voltage $V_{CS}$ from the sampling circuit 70, and becomes low-level to indicate absence of sudden increase of the input when the detection voltage $V_{CS}$ has not increased to or above the detection criterion. The comparator 71e provides the output signal to the switching stop unit 66.

[1-1-2(6). Output Voltage Detecting Unit 65]

The output voltage detecting unit 65 detects whether the DC output voltage $V_{out}$ is at or above the lower limit voltage. The lower limit voltage may be, for example, the lower limit of the voltage that the DC output voltage $V_{out}$ may have without sudden increase of the load. The output voltage detecting unit 65 includes a comparator 65a. A non-inverting input terminal of the comparator 65a is connected to the feedback terminal FB, and receives the feedback voltage $V_{FB}$ as an example of the DC output voltage $V_{out}$, and an inverting input terminal of the comparator 65a receives a reference voltage $V_{65}$ as an example of the lower limit voltage. The reference voltage $V_{65}$ may be a voltage that serves as a threshold for detecting sudden increase of the load. Thus, an output signal of the comparator 65a becomes high-level to indicate absence of sudden increase of the load when the feedback voltage $V_{FB}$ is at or above the reference voltage $V_{65}$, and becomes low-level to indicate sudden increase of the load when the feedback voltage $V_{FB}$ is below the reference voltage $V_{65}$. The comparator 65a provides the output voltage to a switching stop unit 66.

[1-1-2(7). Switching Stop Unit 66]

When the detection voltage $V_{CS}$ has increased to or above the detection criterion and the DC output voltage $V_{out}$ is at or above the lower limit voltage, the switching stop unit 66 controls the switching device Q1 to be OFF during a predetermined period (also called a "delay period"). The switching stop unit 66 includes an NAND gate 66a and a counter 66b.

The NAND gate 66a outputs an inverted signal of the logical product of the output signal of the output voltage detecting unit 65 and the output signal of the input increase detecting unit 64. Thus, the output signal of the NAND gate 66a becomes low-level when the output signal of the output voltage detecting unit 65 indicates the high-level (in the present embodiment, as an example, absence of sudden increase of the load) and the output signal of the input increase detecting unit 64 indicates the high-level (in the present embodiment, as an example, sudden increase of the input), and becomes high-level otherwise. The NAND gate 66a provides the output signal to the counter 66b.

The counter 66b receives a clock signal at a clock terminal, and receives an output signal from the NAND gate 66a at a reset terminal. When a low-level signal is inputted to the reset terminal, the counter 66b outputs a signal Vc that remains high-level during the delay period. The counter 66b provides the output signal Vc to the OR gate 63e of the switch control unit 63. Thus, when the detection voltage $V_{CS}$ has increased to or above the detection criterion and the DC output voltage $V_{out}$ is at or above the lower limit voltage, the switching device Q1 is controlled to be OFF during the delay period.

The counter 66b may further provide the output signal Vc to the discharging unit 67. Note that the switching stop unit 66 may provide a signal of the logical product of the output signal of the output voltage detecting unit 65 and the output signal of the input increase detecting unit 64 to the discharging unit 67, instead of the output signal Vc of the counter 66b.

[1-1-2(8). Discharging Unit 67]

When the detection voltage $V_{CS}$ has increased to or above the detection criterion and the DC output voltage $V_{out}$ is at or above the lower limit voltage, the discharging unit 67 discharges the capacitors C50, C51. The discharging unit 67 includes a resistor 67a and an N-channel MOSFET 67b. The resistor 67a is a current limiting resistor, and limits current flowing through the N-channel MOSFET 67b. The N-channel MOSFET 67b is connected between the voltage error detecting and compensating terminal COMP and the ground, and the gate of the N-channel MOSFET 67b is driven by the output signal Vc from the switching stop unit 66. Thus, when the output signal from the switching stop unit 66 becomes high-level, the N-channel MOSFET 67b turns ON to discharge the capacitors C50, C51.

In the power supply control device 6 as described above, when a detection value corresponding to current flowing through the boost chopper 4 (in the present embodiment, as an example, a detection voltage $V_{CS}$) has increased to or above the detection criterion and the DC output voltage $V_{out}$ is at or above the lower limit voltage, the capacitors C50, C51 that generate the error signal $V_{COMP}$ are discharged. Therefore, when the input current is suddenly increased without sudden increase of the load, the capacitors C50, C51 are discharged to extend the time period during which the error signal $V_{COMP}$ is smaller than the ramp wave Ramp. This extends the time period during which the RS flip-flop 63f is reset and reduces the ON-width of the switching device Q1. This can prevent component destruction due to increase of the maximum current flowing to the switching device Q1 from the boost chopper 4 during the original ON time upon increase of the input voltage (as an example, component destruction due to a surge voltage upon turning OFF the switching device Q1).

Also, when the detection voltage $V_{CS}$ has increased to or above the detection criterion and the DC output voltage $V_{out}$ is at or above the lower limit voltage, the switching device Q1 is controlled to be OFF during the delay period. This can reliably prevent the switching device Q1 from being turned ON and causing overvoltage of the DC output voltage $V_{out}$.

In addition, the sampling timing of the sampling circuit 70 corresponds to the timing of the switching device Q1 switching from ON to OFF, so that the detection criterion of the detection voltage $V_{CS}$ is set in correspondence with the peak value of the detection voltage $V_{CS}$ during the previous ON period. This can prevent discharge of the capacitors C50, C51 in a normal condition in which the detection voltage $V_{CS}$ is gradually increased in correspondence with the waveform of the AC input voltage, and allow discharge of the capacitors C50, C51 in an abnormal condition in which the AC input voltage is suddenly increased.

In addition, the detection voltage $V_{CS}$ generated at the current detecting resistor R3 is used as a detection value for detecting increase of the input. Thus, the power supply control device 1 can be simpler than a power supply control device 1 provided with a dedicated terminal for detecting the input voltage.

In addition, charging or discharging current is generated at the error amplifier 61a in correspondence with the difference between the feedback voltage $V_{FB}$ corresponding to the DC output voltage $V_{out}$ and the reference voltage $V_{61}$ to charge or discharge the capacitors C50, C51. Thus, when the load fluctuates and the DC output voltage $V_{out}$ deviates from the reference voltage, the capacitors C50, C51 are charged or discharged by charging or discharging current and the error signal $V_{COMP}$ fluctuates, so that the ON/OFF widths of the switching device Q1 change. Thus, the DC output voltage $V_{out}$ can be maintained at the reference voltage when the load changes.

[2. Operation Waveforms]

Figure 2:
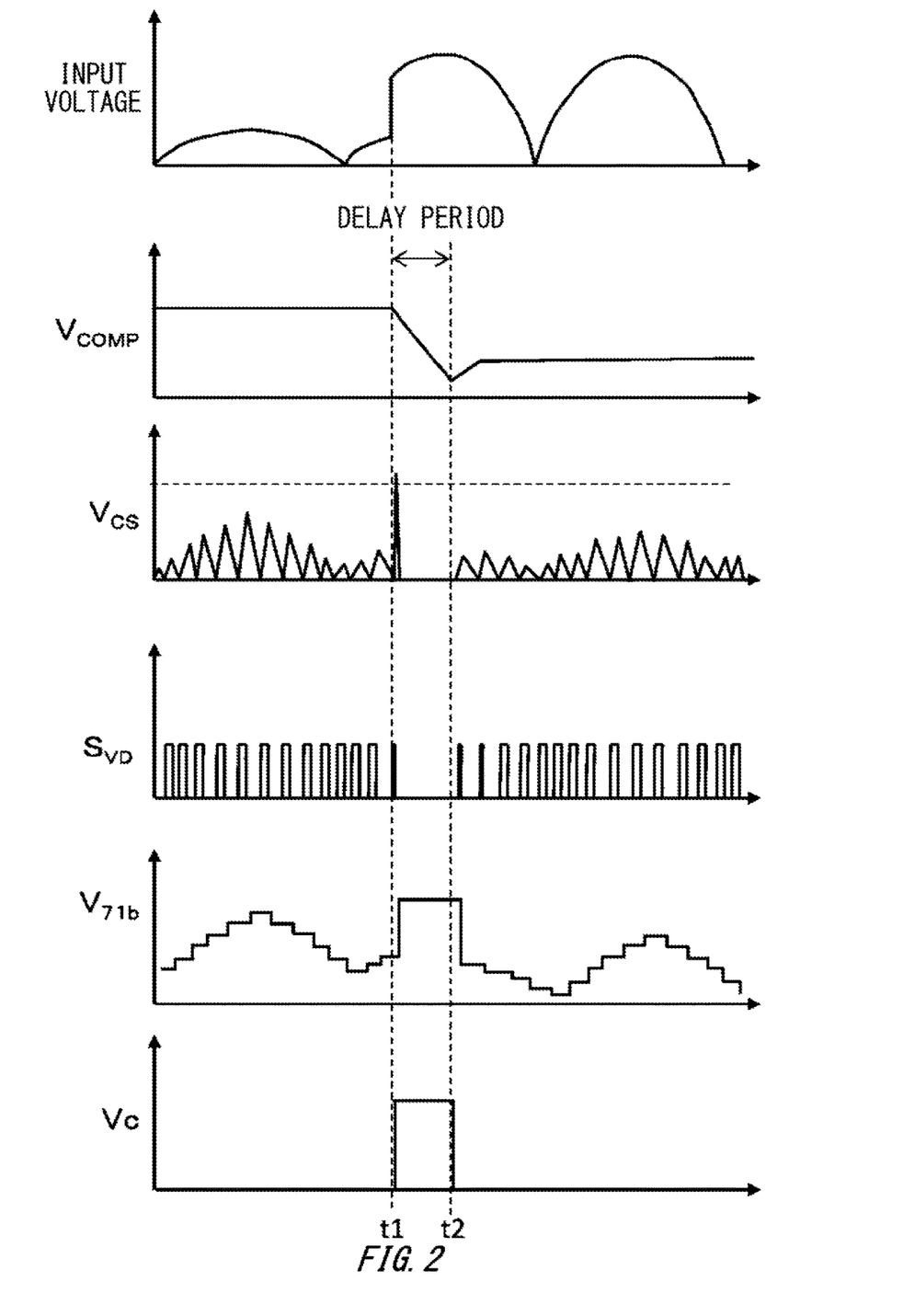
FIG. 2 shows some operation waveforms of the power supply control device 6.

FIG. 2 shows some operation waveforms of the power supply control device 6. In FIG. 2, a vertical axis indicates a voltage, and a horizontal axis indicates the time. Note that the "input voltage" in FIG. 2 indicates the voltage inputted from the full-wave rectifying circuit 3 to the boost chopper 4.

In the steady state, when the switching device Q1 is turned ON and turned OFF, a detection voltage $V_{CS}$ is sampled by the sampling circuit 70 at the timing of turning OFF, and the differential amplifier 71a outputs an output signal V71b obtained by multiplying the detection voltage $V_{CS}$ by the gain. At the time point t1, the detection voltage $V_{CS}$ rises as the input voltage is suddenly increased (as an example, the AC power supply 2 is switched from a 90 V AC power supply to a 264 V AC power supply). Note that the detection voltage $V_{CS}$ rises at the timing of the drive signal $S_{VD}$ as a voltage of the output terminal OUT switching from the low-level to the high-level, and has a peak voltage at the timing of the drive signal $S_{VD}$ switching from the high-level to the low-level. The comparator 71e compares the output signal V71b obtained by multiplying the detection voltage $V_{CS}$ sampled by the sampling circuit 70 upon the last turning OFF by the gain with the present detection voltage $V_{CS}$, and, when the present detection voltage $V_{CS}$ is determined to be larger than the output signal V71b, outputs a high-level output signal that indicates sudden increase of the input. Note that, although not shown in FIG. 2, at this time in the present embodiment, there is no sudden increase of the load and the output signal from the output voltage detecting unit 65 is high-level. Thus, the output signal of the NAND gate 66a becomes low-level and the output signal Vc of the counter 66b becomes high-level during the delay period (as an example, 1 µs to 10 µs), so that the OFF state of the switching device Q1 is maintained and the capacitors C50, C51 are discharged by the discharging unit 67 to reduce the error voltage $V_{COMP}$. At the time point t2, when the delay period ends, the output signal Vc of the counter 66b becomes low-level. Thus, the switching device Q1 restarts its switching operation in a state where the error voltage $V_{COMP}$ is low.

[3. Operation]

Figure 3:
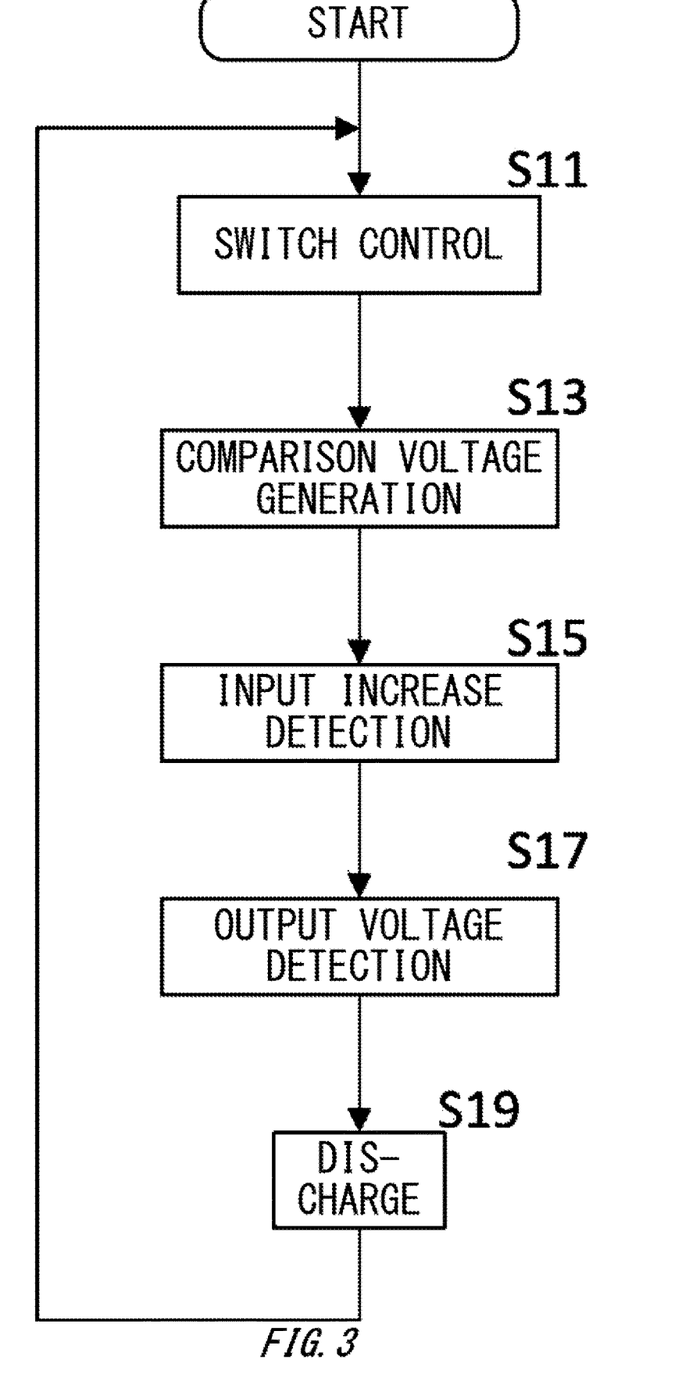
FIG. 3 shows some operations of the power supply control device 6.

FIG. 3 shows some operations of the power supply control device 6. The power supply control device 6 controls the boost chopper 4 while preventing component destruction by performing processes of steps S11 to S19.

In step S11, the switch control unit 63 controls ON/OFF of the switching device Q1 of the boost chopper 4 by using a ramp wave Ramp. For example, the switch control unit 63 controls the switching device Q1 so that the switching device Q1 turns OFF in a time period when the ramp wave Ramp becomes larger than the error signal $V_{COMP}$.

In step S13, the error amplifier 61a of the comparison voltage generating unit 61 charges or discharges the capacitors C50, C51 that generate the error signal $V_{COMP}$ in correspondence with the DC output voltage $V_{out}$ outputted from the boost chopper 4. For example, the error amplifier 61a generates charging or discharging current corresponding to the voltage difference between the feedback voltage $V_{FB}$ and the reference voltage $V_{61}$ and charges or discharges the capacitors C50, C51.

In step 15, the input increase detecting unit 64 detects whether the detection voltage $V_{CS}$ has increased to or above the detection criterion. For example, when the rated value of the input AC voltage is raised due to switching of the AC power supply 2 that supplies electrical power to the boost chopper 4, the input increase detecting unit 64 may detect that the detection voltage $V_{CS}$ has increased to or above the detection criterion.

In step S17, the output voltage detecting unit 65 detects whether the DC output voltage $V_{out}$ is at or above the lower limit voltage. Thus, presence or absence of sudden increase of the load is detected.

In step S19, when the detection voltage $V_{CS}$ has increased to or above the detection criterion and the DC output voltage $V_{out}$ is at or above the lower limit voltage, the discharging unit 67 discharges the capacitors C50, C51. Thus, when the input current is suddenly increased without sudden increase of the load, the capacitors C50, C51 are discharged to reduce the ON-width of the switching device Q1. This prevents component destruction. Afterwards, the power supply control device 6 repeats the processes of steps S11 to S19. Note that the power supply control device 6 may move to the process of step S11 without discharging the capacitors C50, C51 when the detection voltage $V_{CS}$ has not increased to or above the detection criterion or when the DC output voltage $V_{out}$ is below the lower limit voltage.

According to the operations described above, when the rated value of the input AC voltage is raised due to switching of the AC power supply 2, increase of the detection voltage $V_{CS}$ to or above the detection criterion is detected, and therefore component destruction due to switching of the power source can be prevented.

[4. Variation]

Note that, although in the above-mentioned embodiment the power supply device 1 is provided with an AC power supply 2 and a full-wave rectifying circuit 3, at least one of those components may be externally connected to the power supply device 1 without being provided in the power supply device 1.

In addition, although the input increase detecting unit 64 described above uses a detection voltage detected by the current detecting resistor R3 as the detection value, the input increase detecting unit 64 may use a detection voltage detected by the zero cross detecting resistor R4 as the detection value.

In addition, although the power supply control device 6 described above includes an oscillator 60, a protection circuit 62, and a switching stop unit 66, at least one of those components may be omitted from the power supply control device 6. For example, the power supply control device 6 may include an AND gate that provides a logical product of the output signal of the output voltage detecting unit 65 and the output signal of the input increase detecting unit 64 to the N-channel MOSFET 67b of the discharging unit 67, instead of the switching stop unit 66.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and steps of each process performed by an apparatus, system, program, and method shown in the claims, embodiments, or diagrams can be performed in any order as long as the order is not indicated by "prior to," "before," or the like and as long as the outputted from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: power supply device, 2: AC power supply, 3: full-wave rectifying circuit, 4: boost chopper, 5: voltage error detecting and compensating circuit, 6: power supply control device, 50: RC phase compensation circuit, 60: oscillator, 61: comparison voltage generating unit, 61a: error amplifier, 62: protection circuit, 62a: overvoltage detecting comparator, 62b: short circuit detecting comparator, 62c: overcurrent detecting comparator, 63: switch control unit, 63a: zero cross detecting comparator, 63b: restart timer, 63c: OR gate, 63d: pulse width modulation comparator, 63e: OR gate, 63f: RS flip flop, 63g: driver, 64: input increase detecting unit, 65: output voltage detecting unit, 65a: comparator, 66: switching stop unit, 66a: NAND gate, 66b: counter, 67: discharging unit, 67a: resistor, 67b: N-channel MOSFET, 70: sampling circuit, 70a: current source, 70b: N-channel MOSFET, 70c: capacitor, 70d: NOR gate, 70e: N-channel MOSFET, 71: increase detecting circuit, 71a: differential amplifier, 71b: amplifier, 71c: voltage dividing resistor, 71d: voltage dividing resistor, 71e: comparator, C0: smoothing capacitor, C1: output capacitor, C50: capacitor, C51: capacitor, D1: diode, L1: inductor, L2: inductor, R0: timing resistor, R1: voltage dividing resistor, R2: voltage dividing resistor, R3: current detecting resistor, R4: zero cross detecting resistor, R50: resistor, Q1: switching device, T: transformer.

What is claimed is:

1. A power supply control device comprising:
    a switch control unit configured to control ON/OFF of a switching device of a boost chopper by using an oscillation wave,
    a comparison voltage generating unit configured to charge or discharge a comparison capacitor that generates a comparison voltage for comparison with the oscillation wave, the comparison voltage corresponding with a DC output voltage outputted from the boost chopper,
    an input increase detecting unit configured to detect whether a detection value corresponding to current flowing through the boost chopper has increased to or above a detection criterion,
    an output voltage detecting unit configured to detect whether the DC output voltage is at or above a lower limit voltage, and
    a discharging unit configured to discharge the comparison capacitor when the detection value has increased to or above the detection criterion and the DC output voltage is at or above the lower limit voltage.

2. The power supply control device according to claim 1, wherein the input increase detecting unit comprises:
    a sampling circuit configured to sample the detection value corresponding to the current flowing through the boost chopper at a timing of switching the switching device from ON to OFF, and
    an increase detecting circuit configured to detect whether the detection value corresponding to the current flowing through the boost chopper has increased to or above the detection criterion relative to the detection value sampled by the sampling circuit.

3. The power supply control device according to claim 1, wherein the input increase detecting unit is configured to input, as the detection value, a voltage generated at a current detecting resistor connected in series to an inductor and the switching device of the boost chopper.

4. The power supply control device according to claim 1 further comprising:
    a switching stop unit configured to control the switching device to be OFF during a predetermined period when the detection value corresponding to the current flowing through the boost chopper has increased to or above the detection criterion and the DC output voltage is at or above the lower limit voltage.

5. The power supply control device according to claim 1, wherein the input increase detecting unit is configured to detect that the detection value corresponding to the current flowing through the boost chopper has increased to or above the detection criterion when a rated value of an input AC voltage is raised due to switching of a power source that supplies electrical power to the boost chopper.

6. The power supply control device according to claim 1, wherein the comparison voltage generating unit is configured to charge or discharge the comparison capacitor by charging or discharging current corresponding to a difference between the DC output voltage and a reference voltage.

7. A power supply control method comprising:
    controlling ON/OFF of a switching device of a boost chopper by using an oscillation wave,
    charging or discharging a comparison capacitor that generates a comparison voltage for comparison with the oscillation wave, the comparison voltage corresponding with a DC output voltage outputted from the boost chopper,
    detecting whether a detection value corresponding to current flowing through the boost chopper has increased to or above a detection criterion,
    detecting whether the DC output voltage is at or above a lower limit voltage,
    discharging the comparison capacitor when the detection value has increased to or above the detection criterion and the DC output voltage is at or above the lower limit voltage.

* * * * *